United States Patent
Mills et al.

(10) Patent No.: US 6,509,926 B1
(45) Date of Patent: Jan. 21, 2003

(54) SURVEILLANCE APPARATUS FOR CAMERA SURVEILLANCE SYSTEM

(75) Inventors: Lawrence Robert Mills, Coral Springs, FL (US); Oleg Zakalinski, Delray Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/505,905

(22) Filed: Feb. 17, 2000

(51) Int. Cl.[7] .................................................. H04N 7/18
(52) U.S. Cl. ...................................................... 348/143
(58) Field of Search ......................... 348/143, 151–152, 348/156, 575, 576, 584, 589, 14.07, 211; 382/283

(56) References Cited

U.S. PATENT DOCUMENTS

| | | | | |
|---|---|---|---|---|
| 4,630,110 A | * | 12/1986 | Cotton et al. ................ | 348/153 |
| 4,698,664 A | * | 10/1987 | Nichols et al. .............. | 348/184 |
| 5,258,837 A | * | 11/1993 | Gormley ...................... | 348/441 |
| 5,402,167 A | * | 3/1995 | Einbinder .................... | 348/152 |
| 5,519,669 A | * | 5/1996 | Ross et al. .................... | 367/93 |
| 5,625,410 A | * | 4/1997 | Washino et al. ............. | 348/154 |
| 5,745,161 A | * | 4/1998 | Ito ............................... | 348/15 |
| 5,801,770 A |   | 9/1998 | Paff et al. .................... | 348/211 |
| 6,208,379 B1 | * | 3/2001 | Oya et al. .................... | 348/213 |

OTHER PUBLICATIONS

Patent Abstracts of Japan, vol. 018, No. 527, Oct. 5, 1994.
Patent Abstracts of Japan, vol. 1996, No. 06, Jun. 6, 1996.

* cited by examiner

*Primary Examiner*—Vu Le
(74) *Attorney, Agent, or Firm*—Robin Blecker & Daley

(57) ABSTRACT

A surveillance apparatus for use in a camera surveillance system, the surveillance apparatus being microprocessor controlled and including an image blanking unit provided to establish privacy zones in which the video images of the surveillance apparatus are partially or totally blanked out to obscure viewing by an operator. The privacy zones are established by designating triangular areas of the image.

18 Claims, 6 Drawing Sheets

PRIVACY ZONE SHIELD 51
(FRONT OF BUILDING
HIDDEN BY PZ SHIELD)

SURVEILLANCE APPARATUS FOR CAMERA SURVEILLANCE SYSTEM

BACKGROUND OF THE INVENTION

This invention relates to a surveillance apparatus and, in particular, to a surveillance apparatus to be used in a camera surveillance system.

Present day camera surveillance systems use a variety of surveillance devices to monitor a location. Typical of these surveillance devices are video monitoring devices which employ a camera and lens assembly. This assembly is usually supported by a housing which is fixedly mounted at the location. The housing is often closed off by a dome made of a plastic or other material.

The camera and lens assembly of the surveillance device define a viewing axis along which the assembly views an image or scene at the location. The lens of the camera and lens assembly conveys the viewed image to an image pickup of the camera where it is converted into an electrical signal. This signal is then conveyed to a monitor at a central location for viewing by the camera surveillance system operator.

Typically, the camera and lens assembly in a video surveillance device includes one or more movable parts whose positions control one or more conditions of the assembly. Adjusting mechanisms (e.g., motors, motor drive circuits and gearing arrangements) are further provided for adjusting the positions of the movable parts so as to alter or change the corresponding conditions of the assembly.

A characteristic of the assembly which is controlled in this fashion is the aforementioned assembly viewing axis. Movable mountings which support the assembly in the housing permit the viewing axis to be tilted in a tilt direction(usually the vertical direction) and panned in a panning direction (usually the horizontal direction).

In addition to the pan and tilt conditions of the assembly, other conditions of the assembly controlled by movable parts are various conditions of the lens portion of the assembly. Typical of these conditions are the so-called focus, zoom and iris conditions of the lens assembly.

U.S. Pat. No. 5,801,770 discloses a surveillance apparatus of the above type wherein the surveillance apparatus includes a stationary housing or platform and a further platform which is rotatably mounted to the stationary housing. The camera and lens assembly is pivotably mounted to the rotatable platform. This permits panning of the viewing axis by rotation of the platform and tilting of the viewing axis by pivoting of the camera and lens assembly.

In the system of the '770 patent, a microprocessor under the control of programming software is disposed on the stationary housing and provides control over a pan motor and a tilt motor which rotate the platform and pivot the camera and lens assembly, respectively. The microprocessor also interfaces with a communications channel which supports bidirectional communication between the surveillance apparatus and the central location.

In this type of system, as above-indicated, the electrical video signal corresponding to the viewed image is conveyed to the central location. At this location, it is supplied to a monitor which recreates and displays the image. Moreover, systems of this type have been further modified so that text material can be included on the monitor with the viewed image. This is accomplished by including a text overlay unit in the apparatus. This unit also under control of the microprocessor and programming software adds menu information and real-time status information, i.e., text information, to the electrical signal corresponding to the viewed image so that the text information is recreated and displayed at the operator monitor along with the video.

In a video surveillance apparatus of the above type, it is often desirable to be able to prevent certain areas of the viewed video image from being recreated and displayed at the monitor at the central location. One proposal for preventing display of these areas, referred to as privacy zones, is to mask the video surveillance apparatus. In particular, non-transparent adhesive tape can be applied to the protective dome of the apparatus to conceal the privacy zones from the field of view.

As can be appreciated, applying tape to the dome of the surveillance apparatus is a tedious and time consuming process. Moreover, the viewed areas of the image adjacent to the taped privacy zones tend to be out-of-focus, reducing the sharpness of the video image. This condition may also require the surveillance apparatus to perform its auto-focus algorithm more frequently than necessary. While baffles may also be used in place of the adhesive tape, they have similar disadvantages.

It is, therefore, an object of the present invention to provide privacy zones in a surveillance apparatus of the above type in a way which avoids the above disadvantages.

It is a further object of the present invention to provide privacy zones in a surveillance apparatus of the above type which are easy to establish and change.

It is an additional object of the present invention to provide privacy zones in a surveillance apparatus of the above type while limiting costs by using existing components.

SUMMARY OF THE INVENTION

In accordance with the principles of the present invention, the above and other objectives are realized in a surveillance apparatus of the above-mentioned type by incorporating into the apparatus an image blanking unit. The image blanking unit acts to modify the electrical video signal corresponding to the viewed image so as to partially or totally obscure or blank the image areas or portions corresponding to one or more preselected privacy zones. In accordance with the invention, a microprocessor control unit of the apparatus and software programming of the apparatus are adapted to control the image blanking unit. This control is effected based on pan, tilt and zoom coordinates associated with privacy the zone location.

In the embodiment of the invention to be disclosed hereinafter, a text overlay unit of the surveillance apparatus is used as the image blanking unit. In particular, the text overlay unit is controlled by the microprocessor and software programming to generate a text overlay signal corresponding to blocks of semi or non-transparent characters defining an image corresponding to the privacy zones. When this overlay signal is added to the video signal corresponding to the viewed image, the non-transparent image areas are overlayed on and totally or partially blank the associated viewed image areas. These areas (privacy zones) thus become obscured and are no longer discernible or viewable. In accordance with the invention, these image areas or privacy zones are established based upon defining triangular blanking areas of the image.

In further accord with the invention, the operator at the central location can communicate with the surveillance apparatus to establish the blank image areas. These blank areas are established based on the pan, tilt and zoom information of the surveillance apparatus and are stored as non-transparent text block characters in RAM memory. They are called from RAM memory by the microprocessor and programming software and fed to the text overlay unit which combines the blanking areas with the video image information as the surveillance apparatus views the scene.

In a further aspect of the invention, the surveillance apparatus is also adapted to generate azimuth and elevation information for viewing on the monitor to provide direction of pan and tilt movement to the operator when the image is obscured by the privacy zone blanking.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
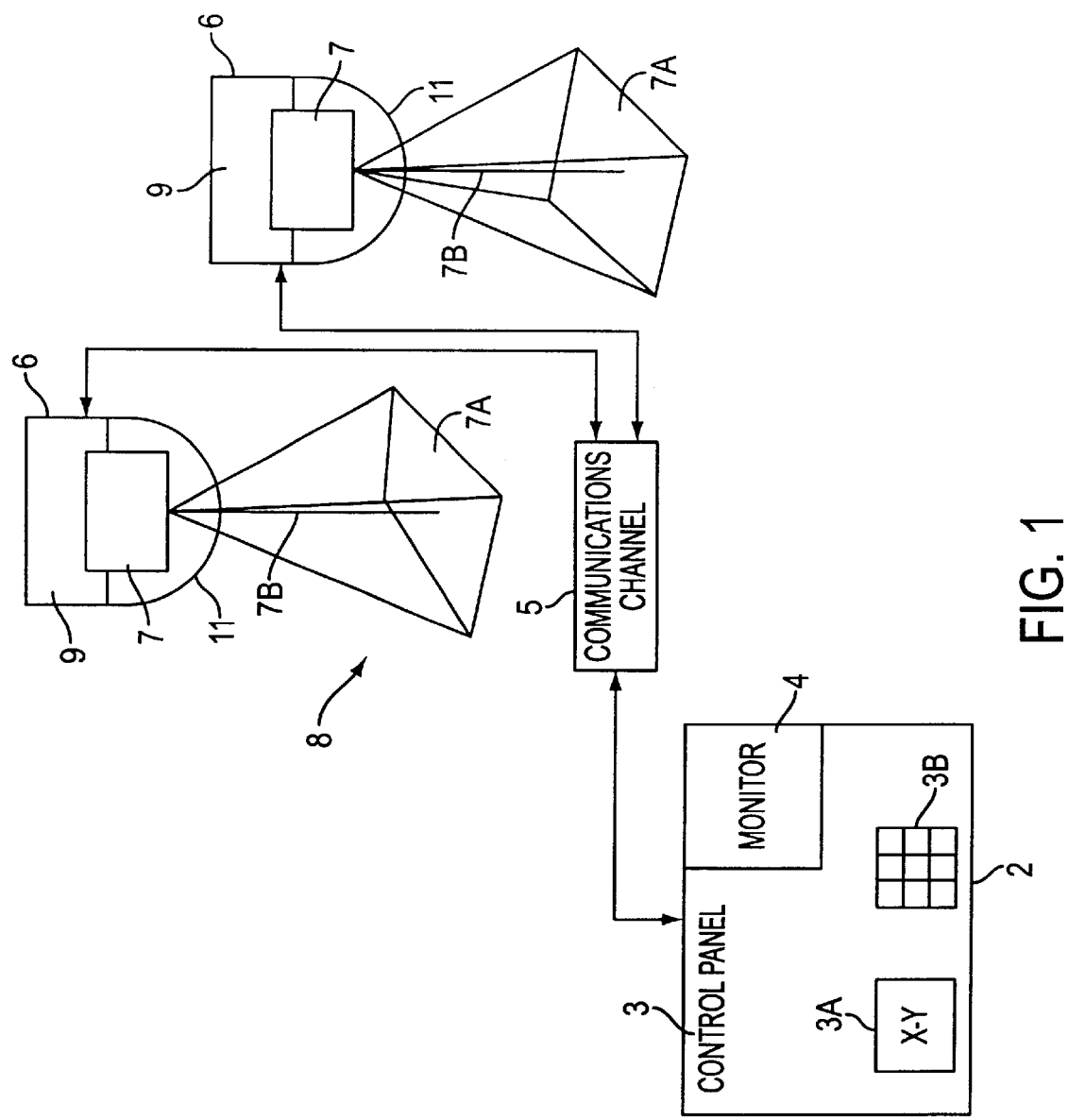
FIG. 1 shows a camera surveillance system utilizing a surveillance apparatus having privacy zones in accordance with the principles of the present invention.

As shown in FIG. 1, a camera surveillance system comprises an operator console 2 having a control panel 3 and a monitor 4. Signals pass between the operator console 2 and a plurality of surveillance devices 6 over a communications channel 5.

The surveillance devices 6 each include a camera and lens assembly 7. Each camera and lens assembly 7 views an area of a location 8 which is remote from the operator location and is in the Field Of View (FOV) 7A and along the viewing axis 7B of the assembly. Each image is converted by the respective camera and lens assembly 7 into an electrical video signal which is supplied to the monitor 4 of the operator console 2 over the communications channel 5.

As shown, each surveillance device 6 comprises an upper housing 9 which is fixedly secured to the location 8 and to which the camera and lens assembly 7 is mounted. A dome-like cover 11 closes the open end of the housing and is of a character which permits the passage of light so that the enclosed assembly 7 can view the location.

Figure 2:
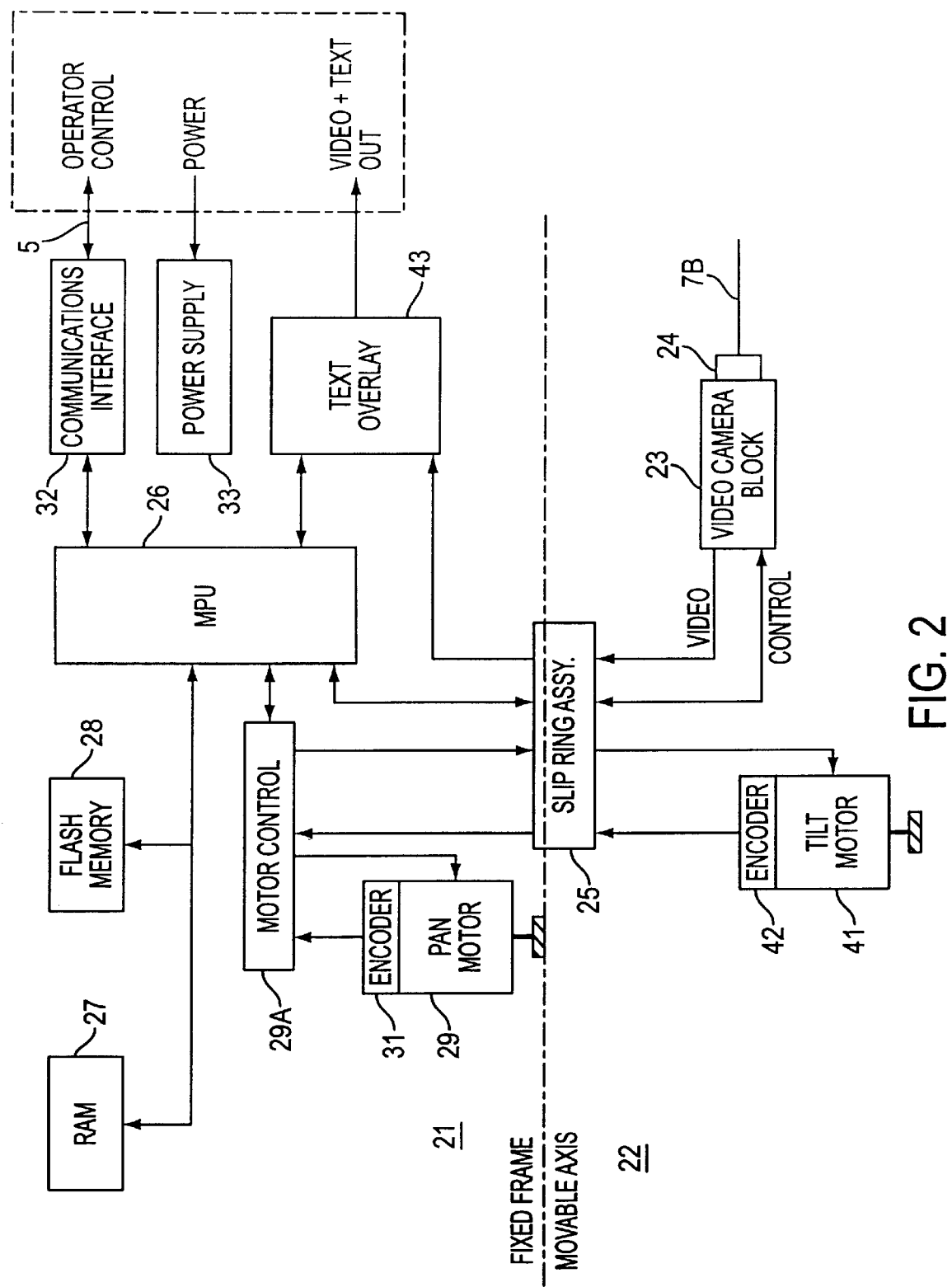
FIG. 2 shows in greater detail a block diagram of the surveillance apparatus of FIG. 1.

FIG. 2 shows in greater detail a block diagram of the components of the camera and lens assembly 7. As shown, the assembly comprises a stationary platform or fixed frame 21 which can be formed as part of the housing 9. A further platform 22 is rotatably mounted to the platform 21. The platform 22 supports a video camera block 23 having a motorized lens assembly 24. The latter components are mounted along a common axis and define the aforementioned FOV 7A and viewing axis 7B of the assembly. Power and various other control signals are routed from the stationary platform 21 via a slip ring assembly 25. The slip ring assembly 25 includes a brush-block/rotor contact assembly which allows the rotating platform to rotate freely, without concern for any direct wiring becoming twisted.

A first printed circuit board on the stationary platform 21 includes a microprocessor unit (MPU) 26, a random access memory (RAM) 27, a FLASH memory memory 28, a motor control and drive circuit 29A, an encoder 31, a communication interface circuit 32 and power supply 33. The drive circuit 29A drives a pan motor 29 which causes rotational movement of the platform 22 and thus panning of the viewing axis 7B of the assembly.

A second printed circuit board is provided on the rotating platform 22. This circuit board provides a connector interface for a tilt motor 41 and an encoder 42. The motor control circuit 29A also provides, through the slip ring assembly 25, drive signals for driving the tilt motor 41 for tilting the platform 22 and providing tilting of the viewing axis 7B of the assembly. The video camera block 23 includes focus, zoom and iris circuits for driving corresponding motors for controlling the focus, zoom and iris conditions of the lens 24 and, therefore, the assembly.

The communications interface 32 provides bi-directional, serial communications between the operator console 2 and the device 6 over the channel 5. Commands are sent to the device 6 based on operator input at the console. This input can be by the joystick or X-Y controller 3A or by the switch control 3B.

The MPU 26 processes commands and receives high speed data from the operator console 2 (via the communications interface 32), re-formats and forwards commands to motor control 29A and the video block 23 on the rotating platform 22. It, therefore, controls the pan and tilt operations of the video camera of the block 23 as well as focus, zoom and iris operations of the lens 24.

The printed circuit board on the platform 21 also supports a text overlay unit 43 through which the electrical video signal from the video camera block 23 passes before being sent to the operator console 2 for display on the monitor 4. The text overlay unit, under control of the MPU 26 and the software programming of the device 6, generates an electrical signal containing text image information and adds the text electrical signal to the electrical video signal. This results in desired text images being overlayed on the video image so as to be visible to the operator on the monitor 4. These text images may include menu information and real-time status information concerning the assembly.

In accordance with the principles of the present invention, the surveillance device 6 is further adapted to define and establish areas of the viewed video image corresponding to desired privacy zones which are to be concealed from view. In these areas, the video image is partially or totally blanked so that it is sufficiently obscured so as not to be visible or discernable to the operator viewing the video image on the monitor 4 of the console 2. More particularly, these areas are established via the MPU 26 and its software programming, in conjunction with an image blanking unit, which in the present embodiment is formed by the text overlay unit 43.

As can be appreciated, the text overlay unit 43, due to its ability to overlay text images on the video image, can act to blank the video images in areas where the text appears. By using blocks of semi or non-translucent or transparent characters generated by the unit, semi or non-translucent or transparent shapes can be established which tint or blank out areas of the video image. By placing these blank areas over the video image corresponding to the privacy zones, the video image will be partially or totally obscured in these areas, thereby concealing from sight any video images in the privacy zones.

Using this capability, the MPU 26 and its software programming can control the text overlay 43 to establish and maintain the desired privacy zones. This is accomplished based on the pan, tilt and the zoom conditions of the surveillance device 6 and the information as to the areas of the viewed image defining the privacy zones.

Figure 3:
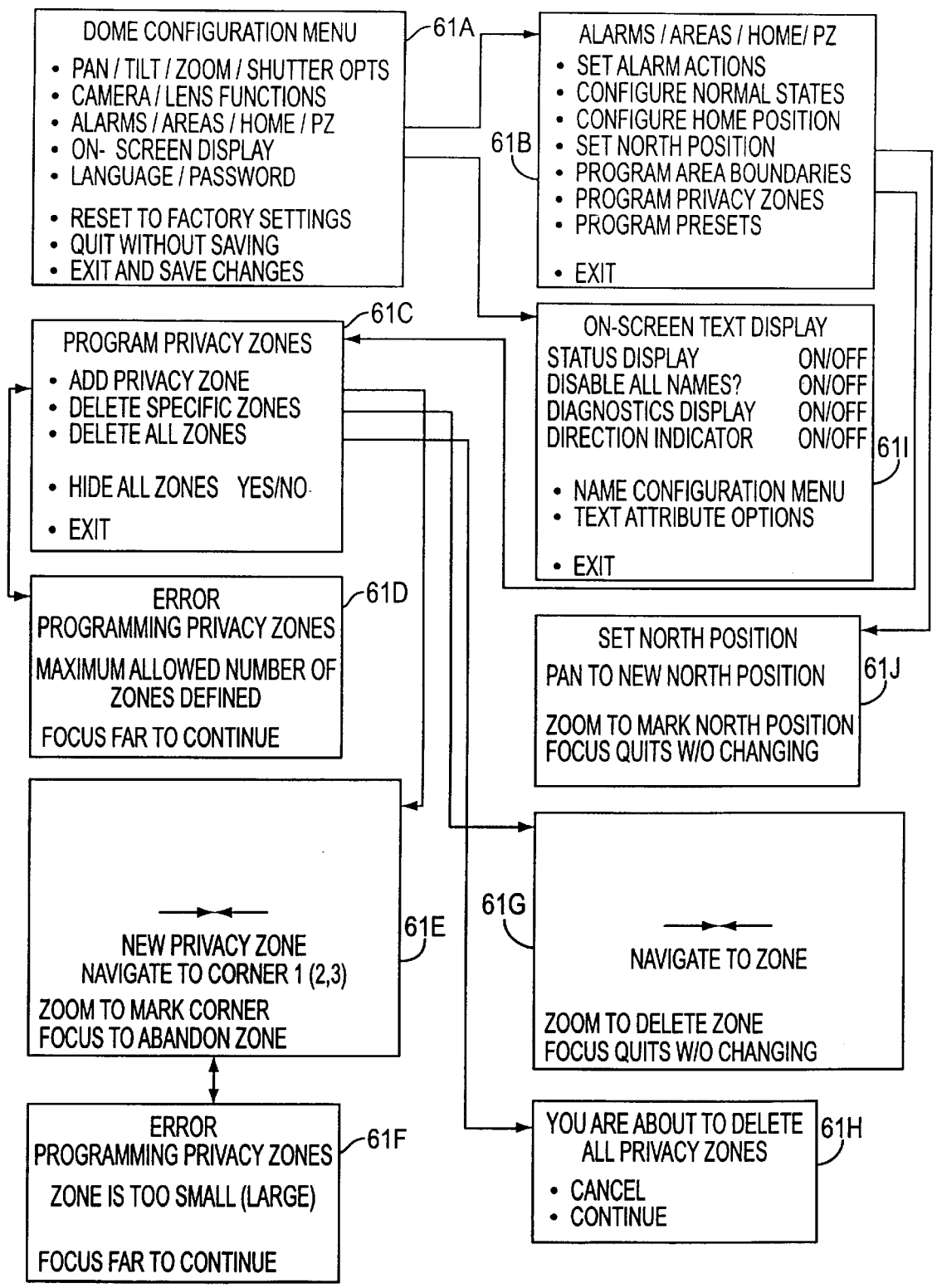
FIG. 3 shows the programming displays for the surveillance apparatus of FIG. 1.
Figure 4:
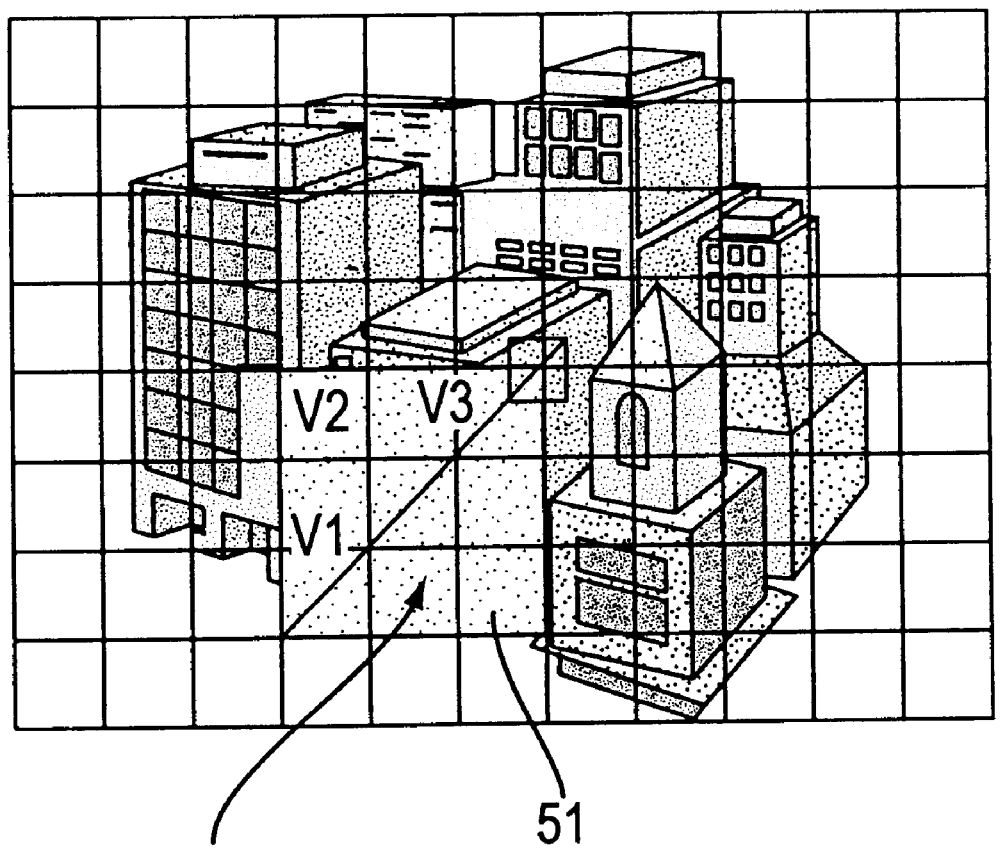
FIG. 4 illustrates the manner in which a privacy zone is established for the surveillance apparatus of FIG. 1.

FIG. 4 shows the establishment of one such privacy zone 51 for a viewed video image on the monitor 4. In establishing the zone 51, the operator utilizes the program displays shown in FIG. 3.

This is done by the operator first selecting the Alarms/Areas/Home/Pz item in the Dome Configuration Menu 61A and the Program Privacy zones item in the Alarms/Areas/Home/PZ display 61B. The operator then selects the Add Privacy zones item in the Program Privacy Zones display 61C. If the Error Programming Privacy zones display 61D does not appear indicating the maximum number of zones has already been defined or focus is to far to define such a zone for the viewed image, the New Privacy zone display 61E appears directing the operator to define the zone.

In particular, as indicated in FIG. 4, the operator marks three vertices to define the outer bounds of the privacy zone desired. Specifically, the programming software displays a cross-hair in the center of the screen. The operator pans and tilts the surveillance device 6 until the cross hair is placed over the position defining a first vertex of the privacy zone. The operator then instructs the software programming to save that vertex (V1). The operator then repeats this operation for the other 2 vertices (V2, V3). A triangular shape is used, as this shape provides the least number of definition points to encompass an area.

When all three vertices are defined, and unless an Error Programming Privacy Zones display 61F is shown indicating the privacy zone is too small or too large or the focus to far, the operator removes the cross-hair from the screen. Based on this information, the programming software constructs a privacy and stores it in the flash memory 28. In particular, the software constructs a parallelogram shape, for the privacy zone by mirroring the vertex with the widest angle against the triangle's longest side, as shown in FIG. 4. The coordinates of the area of the viewed image defined by the parallelogram are stored in a table in the flash memory as the privacy zone information. The data in this table is then used when the surveillance device 6 views the video image to determine the text character block of the text overlay unit 43 which needs to be semi or non-transparent to blank the video image corresponding to the privacy zone.

More particularly, during the operation of the system in FIG. 1, as the surveillance device 6 is being panned and tilted by the operator, the programming software determines first whether any privacy zones have been enabled and defined for the surveillance device. If the operator has enabled privacy zones and there are privacy zones defined, the software programming then checks the current viewing coordinates to determine whether a privacy zone is to be used to blank an area of the video image. To this end, the software programming compares the coordinates of the privacy zones stored in the flash memory 28 against the current displayed image FOV. If one or more privacy zones fall within the current FOV, the programming software marks those privacy zones as visible.

If any privacy zone is marked as visible, the locations of text character blocks of the text overlay unit are checked against the coordinates of the relevant privacy zones. A determination is then made as to whether the coordinates of a defined privacy zone encompass one or more text character blocks. For each text character block or portion of text block that falls within the coordinates of the defined privacy zone, text overlay unit 43 changes the block's attribute from transparent to partially or totally non-transparent.

Figure 5:
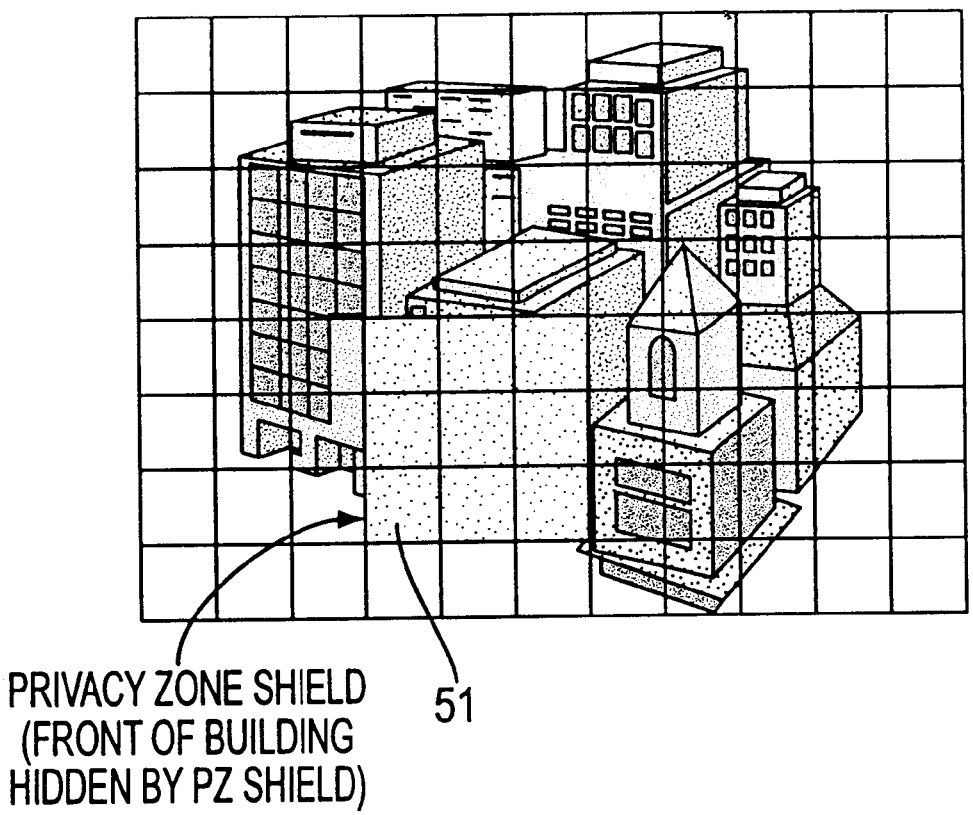
FIG. 5 shows a video image of the surveillance apparatus of FIG. 1 having a privacy zone established as in FIG. 4.

For the privacy zone established in FIG. 4, this results in blocking of the video image defined by the zone. This is shown in FIG. 5.

As the surveillance device continues to pan, tilt and/or zoom, the programming causes changes in the pan, tilt or zoom coordinates to be monitored. In particular, the programming causes the current pan and tilt angles to be obtained from the motor encoders 31 and 42. The zoom magnification is also obtained from video camera block 23. The software programming then converts this data from the X-Y coordinate space of the surveillance device mount to the coordinates of the camera's FOV. The software programming then compares the current data with the previously saved data and if there is any change, the new data is stored and a differential FOV is calculated.

The changes in FOV are then applied by the software programming to redefine the text character blocks defining the one or more privacy zones. In particular, a text character block is moved right or left for changes in pan angle and up or down for changes in tilt angle. The size of the block is also changed for changes in zoom magnification. This keeps the text character block in the proper image area of the privacy zone and prevents the operator from viewing this image area. This process is repeated as the surveillance device continues to be operated so as to maintain the privacy zones concealed at all times.

As can be appreciated, the text overlay unit 43, which can be formed from a text display microchip, must support a character background transparency or opaqueness attribute. This requires the turning on and off of this attribute on a per character basis. The unit 43 must also support character color or border attributes so that the characters remain visible regardless of their background transparency settings. Moreover, it is preferable that the on-screen display of the unit 43 be able to completely and uniformly mask the entire area of the video image. The character size must also provide suitable granularity to allow selectively masking parts of a video frame. Depending on the used video format the size of a single character of the unit should likely be less than 16 by 16 pixels.

It is also desirable that the text overlay unit 43 be able to support multiple text pages. However, if the unit can display only one page at a time, virtual text pages may be simulated in the software programming of the MPU 26. This may be needed particularly if it is desired that the system 1 display textual information and graphics primitives at the same time on the monitor 4. Moreover, use of multiple virtual pages in the software programming may greatly simplify the programming by separating text- and graphics-related code.

The use of virtual display pages also helps split information that the overlay unit 43 superimposes on the video image into distinct unrelated layers. These layers or pages can then be independently generated in memory by well-defined separate programming components. When all the pages are built by the programming a final composite page is constructed and copied onto the overlay unit.

Figure 6:
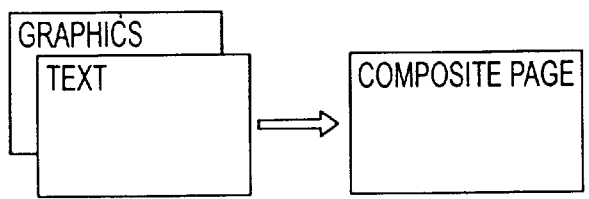
FIGS. 6–9 show further illustrative material for generating privacy zones.

FIG. 6 illustrates the simplest case where the composite page is built of two pages; the first containing only text (symbols) and the second containing only graphics (attributes). For creating character blocks corresponding to the image areas of privacy zones, the attribute page is the one used.

As above-indicated, when the surveillance device 6 is panned, tilted and zoomed, the character blocks of the unit 43 corresponding to the privacy zones appear fixed relative to the video image. They move left and right and up and down as the device 6 pans and tilts, and enlarge and shrink, as the device zooms in and out. To ensure this, a three dimensional ("3D") vector model is used by the software programming to describe and store the position and size of each of the character blocks. Moreover, as above-indicated, the marked shape for a composite block is flat triangle and more complex shapes are then constructed by the software out of these triangles. Each triangle is defined by coordinates of its vertices.

Figure 7:
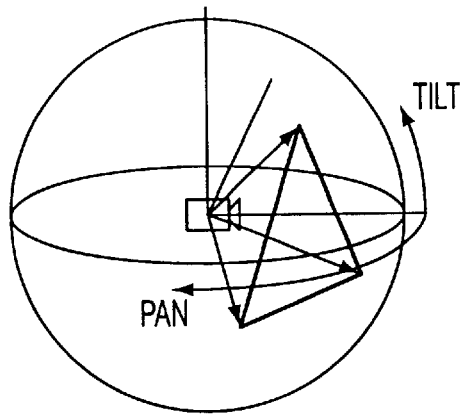

More particularly, in a 3D space, locations are specified by 3D vectors, originating from a common center point. For the camera and lens assembly 7, fixedly mounted to the stationary platform, the center is the focal point of the camera. Since the stationary platform never moves, the distance of the objects from the focal point is not a consideration and all vectors can be considered being of magnitude 1. As a result, we are left with a sphere of radius 1 with the center at the focal point of the camera. The triangles representing areas of the space are wrapped around the sphere. For simplicity and to speed of calculations, the triangles may be safely considered as flat (FIG. 7). These triangles are used as building blocks of arbitrary shapes for defining the character blocks of the text overlay unit.

In particular, for current pan and tilt angles, a rotation matrix is calculated and applied to the triangle vectors representing the shapes. The rotation matrix translates the coordinate system of the field of view into the system attached to the camera. Then, for each character in the monitor display table a similar vector needs to be calculated. The vector points at the center of the character rectangle, its origin is the camera's focal point. For the device 6, with its pan and tilt functions, it is easy to define a new triangle by specifying its three vertices. The operator aims at the triangle's vertices with a target symbol placed in the center of the monitor, as above-described.

If the MPU 26 is lacking floating-point capabilities or the available bandwidth is low then integer arithmetic operations need to be used for calculations, which may impose various limitations on the size of the triangles. In particular, it may become impossible to maintain precision of the calculations good enough to support small or "narrow" triangles. In other words, it can become important to ensure that the operator not define a triangle with the angular distance between any two of its vertices being smaller than 0.5 degrees. The target mark in the center of the screen can be used to provide feedback to the operator as to where valid vertices can be placed. For example, when the target is positioned too close to another vertex making it an invalid spot to place a new vertex, the target can blink or be shown in a different color.

Figure 8:
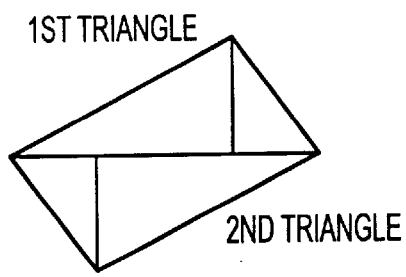

In real world images there are more rectangular objects than triangular. An average operator of the surveillance system thus feels more comfortable with shapes based on rectangles or parallelograms. For this reason, as above-described, the software programming supplements each newly defined triangle with an automatically generated companion triangle to form a parallelogram. The most natural way of generating the second triangle appears to be the one when the vertex with the widest angle is mirrored against the triangle's longest side (FIG. 8). This method allows rectangles or parallelograms to be created by only requiring the user to define three points.

As can be appreciated from FIG. 3 and from the Program Privacy Zone display 61C, the system programming permits specific and all privacy zones to be deleted. When desiring to delete a specific zone, the Delete Specific Zones item in display 61C is selected. The display 61G then indicates that the operator navigate the target mark or cross-hair to the character block defining the privacy zone to be deleted. When the cross-hair is situated at this zone, the operator actuates to zoom function to delete the zone.

When the Delete All Zones item is selected in display, the display 61H appears indicating this selection to ensure that the operator is aware of the selection. The operator can then continue with the deletion or cancellation of the zones.

As can be appreciated, when the character blocks of the text overlay unit 43 defining one or more privacy zones cover the whole monitor, the operator may easily lose orientation. In order to avoid this, the software programming of the surveillance device 6 is further adapted to provide an on-screen direction indicator, showing the azimuth (pan) and elevation (tilt) of the device. The direction indicator shows current azimuth and elevation angles in degrees and is enabled by the operator selecting the On item adjacent the Direction Indicator line in the On-Screen Text Display 61I shown in FIG. 3.

Figure 9:
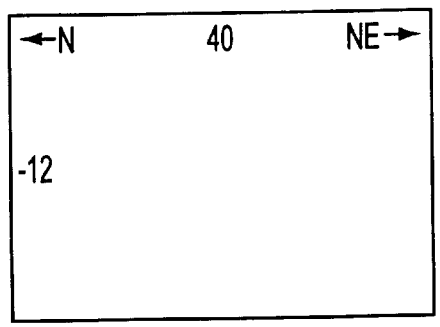

As seen in FIG. 9, azimuth is shown in the middle of the top edge of the monitor and measured in degrees (0–359) in the east direction. The well-known azimuth points are shown in capital letters (N for 0, NE for 45, and so on), otherwise digits are used. Azimuth directions towards the two nearest well-known points are indicated in the top-left and top-right corners of the screen.

The north position can be reprogrammed by selecting the Set North Position in the display 61B. As seen in the display 61J, the device 6 is panned to the new North position. The operator then operates the zoom function to set this position.

Elevation is shown on the monitor in the middle of the left-hand side of the screen. This is also shown in FIG. 9.

In all cases it is understood that the above-described arrangements are merely illustrative of the many possible specific embodiments. Numerous and varied other arrangements can be readily devised in accordance with the principles of the present invention without departing from the spirit and scope of the invention.

What is claimed is:

1. A surveillance apparatus for use in a camera surveillance system, the surveillance apparatus comprising:

a camera and lens assembly capable of panrung, tilting and zooming, said camera and lens assembly generating an output video signal corresponding to an image in the field of view of said camera and lens assembly;

an image blanking unit receiving said output video signal and modifying said output video signal to one of partially and totally blank portions of said image, said blanked portions of said image corresponding to pre-selected privacy zones; and a control unit for controlling the image blanking unit responsive to one or more of the pan, tilt and zoom conditions of said camera and lens assembly.

2. Apparatus in accordance with claim 1 wherein:

said control unit controls said camera and lens assembly to have selected one or more of pan, tilt and zoom conditions.

3. Apparatus in accordance with claim 2 wherein:

said control unit is responsive to signals from an operator at a remote location having a monitor for displaying said image.

4. Apparatus in accordance with claim 3 further comprising:
an interface for transmitting said modified output video signal to said remote location.

5. Apparatus in accordance with claim 2 wherein:
said control unit includes a microprocessor, a memory and software programming for instructing said microprocessor in causing said control unit to control said camera and lens assembly and said image blanking unit.

6. Apparatus in accordance with claim 5 wherein:
said memory includes information for establishing said privacy zones based on the pan, tilt and zoom conditions of said camera and lens assembly.

7. Apparatus in accordance with claim 6 wherein:
said information is established by designating one or more triangle areas of said image to define a privacy zone.

8. Apparatus in accordance with claim 7 wherein:
said information is established by designating a triangle area of said image, whereby a complementary triangle area is automatically designated to define a parallelogram-shaped privacy zone.

9. Apparatus in accordance with claim 6 wherein:
said image blanking unit is formed by a text overlay unit for providing a text overlay signal on the video output signal.

10. Apparatus in accordance with claim 9 wherein:
said text overlay signal includes partially transparent and non-transparent text overlay characters which blank the areas of the video image over which they lie.

11. Apparatus in accordance with claim 10 wherein:
said information stored in said memory includes information defining blocks of said text overlay characters corresponding to said privacy zones.

12. Apparatus in accordance with claim 11 wherein:
one or more of said blocks of text overlay characters defines an area of said image formed by combining triangular areas.

13. Apparatus in accordance with claim 12 wherein:
said microprocessor and software programming generate information as to the azimuth and elevation angles of said camera and lens assembly for display with the image corresponding to said modified output video signal.

14. A surveillance apparatus for use in a camera surveillance system, the surveillance apparatus comprising:
a camera and lens assembly capable of panning, tilting and zooming, said camera and lens assembly generating an output video signal corresponding to an image in the field of view of said camera and lens assembly; and
an image blanking unit receiving said output video signal and modifying said output video signal to one of partially and totally blank portions of said image, said blanked portions of said image corresponding to preselected privacy zones, said image blanking unit being formed by a text overlay unit for providing a text overlay signal on the output video signal.

15. Apparatus accordance with claim 14 wherein:
said text overlay signal includes partially transparent and non-transparent text overlay characters which blank the areas of the video image over which they lie.

16. Apparatus in accordance with claim 15 wherein:
blocks of said text overlay characters correspond to said privacy zones.

17. Apparatus in accordance with claim 16 wherein:
one or more of said blocks of text overlay characters define an area of said image formed by combining triangular areas.

18. A surveillance apparatus for use in a camera surveillance system, the surveillance apparatus comprising:
a camera and lens assembly capable of panning, tilting and zooming, said camera and lens assembly generating an output video signal corresponding to an image in the field of view of said camera and lens assembly;
an image blanking unit receiving said output video signal and modifying said output video signal to one of partially and totally blank portions of said image, said blanked portions of said image corresponding to preselected privacy zones; and
a unit for generating information as to the azimuth and elevation angles of said camera and lens assembly for display with the image corresponding to said modified video signal.

\* \* \* \* \*

UNITED STATES PATENT AND TRADEMARK OFFICE
CERTIFICATE OF CORRECTION

PATENT NO.    : 6,509,926 B1
DATED         : January 21, 2003
INVENTOR(S)   : Mills et al.

It is certified that error appears in the above-identified patent and that said Letters Patent is hereby corrected as shown below:

<u>Column 8,</u>
Line 47, replace "panrung" with -- panning --

Signed and Sealed this

First Day of July, 2003

JAMES E. ROGAN
*Director of the United States Patent and Trademark Office*